United States Patent
Saint-Marcoux et al.

(10) Patent No.: US 9,428,074 B2
(45) Date of Patent: Aug. 30, 2016

(54) VEHICLE COMPRISING A BATTERY AND MEANS FOR DETERMINING A MAXIMUM ALLOWABLE POWER FOR THE BATTERY, AND CORRESPONDING METHOD

(71) Applicant: RENAULT s.a.s., Boulogne-Billancourt (FR)

(72) Inventors: Antoine Saint-Marcoux, Palaiseau (FR); Claire Oberti, Paris (FR); Marc-Henri Giraud, Issy les Moulineaux (FR); Bruno Delobel, Issy les Moulineaux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/417,665

(22) PCT Filed: Jul. 25, 2013

(86) PCT No.: PCT/FR2013/051797
§ 371 (c)(1),
(2) Date: Jan. 27, 2015

(87) PCT Pub. No.: WO2014/016523
PCT Pub. Date: Jan. 30, 2014

(65) Prior Publication Data
US 2015/0202982 A1    Jul. 23, 2015

(30) Foreign Application Priority Data

Jul. 27, 2012 (FR) ...................... 12 57311

(51) Int. Cl.
*B60L 11/18* (2006.01)
*H01M 10/46* (2006.01)
(Continued)

(52) U.S. Cl.
CPC ............. *B60L 11/1861* (2013.01); *B60L 7/10* (2013.01); *B60L 11/187* (2013.01);
(Continued)

(58) Field of Classification Search
CPC .. B60L 11/1861; B60L 7/10; B60L 11/1862; B60L 11/187; B60W 10/26; B60W 2510/244; B60W 2510/246; H02J 7/0029; H02J 2007/0039; H02P 3/14; H01M 10/46; H01M 10/48; H01M 10/486; H01M 10/443; H01M 2220/20; Y02T 10/705; Y02T 10/7044; Y02T 10/92; Y02T 10/7005
See application file for complete search history.

(56) References Cited

U.S. PATENT DOCUMENTS 5,910,722 A 6/1999 Lyons et al.
2007/0126404 A1* 6/2007 Iida et al. ............... 320/136
(Continued)

OTHER PUBLICATIONS

International Search Report issued Oct. 2, 2013 in PCT/FR2013/051797.
(Continued)

*Primary Examiner* — Rodney Butler
(74) *Attorney, Agent, or Firm* — Oblon, McClelland, Maier & Neustadt, L.L.P.

(57) ABSTRACT

An automotive vehicle with electric or hybrid propulsion including a rechargeable electric accumulation battery and a braking system allowing recovery of energy, the battery being rechargeable during braking phases and during charging phases under control of a supply system including a mechanism determining a maximum allowable power for the battery. The mechanism determining the maximum allowable power for the battery includes a first mapping making it possible to read a first maximum power on the basis of a temperature and of a state of charge of the battery, and a second mapping making it possible to read a second maximum power based on the temperature and of the state of charge of the battery.

12 Claims, 4 Drawing Sheets

(51) Int. Cl.
  *H01M 10/48* (2006.01)
  *B60L 7/10* (2006.01)
  *B60W 10/26* (2006.01)
  *H02J 7/00* (2006.01)
  *H02P 3/14* (2006.01)
  *H01M 10/44* (2006.01)

(52) U.S. Cl.
  CPC .......... *B60L 11/1862* (2013.01); *B60W 10/26* (2013.01); *H01M 10/46* (2013.01); *H01M 10/48* (2013.01); *H01M 10/486* (2013.01); *H02J 7/0029* (2013.01); *H02P 3/14* (2013.01); *B60W 2510/244* (2013.01); *B60W 2510/246* (2013.01); *H01M 10/443* (2013.01); *H01M 2220/20* (2013.01); *H02J 2007/0039* (2013.01); *Y02T 10/705* (2013.01); *Y02T 10/7005* (2013.01); *Y02T 10/7044* (2013.01); *Y02T 10/92* (2013.01)

(56) References Cited

U.S. PATENT DOCUMENTS

2009/0218987 A1  9/2009  Tominaga
2012/0007545 A1  1/2012  Yoshida et al.
2012/0239236 A1* 9/2012  Eom ........................ 701/22

OTHER PUBLICATIONS

Qingsheng Shi, et al., "An Improved Electric Vehicle Regenerative Braking Strategy Research" Advances in Computer Science and Information Engineering, vol. 2, XP008161800, May 2012, pp. 637-642 and cover page.

Jingang Guo, et al., "Regenerative Braking Strategy for Electric Vehicles" Intelligent Vehicles Symposium, XP031489956, 2009, pp. 864-868.

* cited by examiner

VEHICLE COMPRISING A BATTERY AND MEANS FOR DETERMINING A MAXIMUM ALLOWABLE POWER FOR THE BATTERY, AND CORRESPONDING METHOD

BACKGROUND

The invention relates to systems for managing electric batteries, and in particular systems for managing electric batteries installed on a motor vehicle and intended to propel said motor vehicle.

These batteries may be either recharged at electric terminals when the vehicle is stationary or recharged by recovering, by means of the electric motor, some of the kinetic energy of the vehicle when said vehicle decelerates. Such a recovery of energy is commonly referred to as regenerative braking.

The batteries may deteriorate or age and may lose their ability to store energy. This aging is dependent on the conditions in which the batteries have been stored and also on the conditions in which the batteries are used when a vehicle is moving.

Battery management systems (BMSs) which limit the amount of power provided to the battery so as not to damage said battery have been proposed. The currents circulating toward the battery or the voltages applied to the battery are thus limited. Furthermore, these limitations are generally calculated on the one hand for braking situations with energy recovery and on the other hand for normal charging situations, that is to say when the vehicle is stationary and a terminal is used.

The maximum power allowable by a battery in a braking situation is generally high and can be applied over a short period of approximately ten seconds without damaging the batteries. For charging (by means of a terminal), the power is generally weaker, but can be applied over a longer period.

When a user is in a long braking phase, for example during the descent of a long hill, braking with electric energy recovery of long duration can be implemented by using the limitation of high power of the braking phases. These long braking phases may damage the batteries of vehicles if they are longer than the 10 seconds corresponding to a normal braking phase. In fact, a high power will be provided to the battery during an excessively long period.

In addition, the power values are usually stored in mappings and can be read depending on the state of charge of the battery and the temperature of the battery. Two mappings can be used: one for each of the situations described above.

BRIEF SUMMARY

The object of the present invention is to improve the electric power supply systems of vehicle batteries, in particular during long braking phases.

In accordance with one embodiment, a motor vehicle with electric or hybrid propulsion is proposed, said vehicle comprising a rechargeable electric accumulation battery, a braking system allowing the recovery of energy, the battery being rechargeable during braking phases and during charging phases (for example when the vehicle is stationary at a terminal) under the control of a power supply system comprising means for determining a maximum allowable power for the battery.

In accordance with a general feature of the vehicle, the means for determining the maximum allowable power for the battery comprise a first mapping making it possible to read a first maximum power on the basis of the temperature and state of charge of the battery, a second mapping making it possible to read a second maximum power on the basis of the temperature and state of charge of the battery, the first maximum power being greater than the second maximum power, the first mapping comprising first maximum power values corresponding to a braking phase and the second mapping comprising second maximum power values corresponding to a charging phase of the battery, and means for calculating said maximum allowable power for the battery, said means being designed to calculate the sum of the first power affected by a first coefficient $\alpha(t)$ between 0 and 1 and of the second power affected by a second coefficient equal to $1-\alpha(t)$.

A limitation dependent on both a read value in a mapping of values corresponding to a charging phase (low values) and a read value in a mapping of values corresponding to a braking phase (high values) is thus applied at each time point. The first coefficient is selected so as to obtain a limitation selected between the first maximum power (if equal to one), the second maximum power (if equal to zero) and a weighting of these two powers if between zero and one.

During a long braking phase it is for example preferable to reduce the first coefficient so as to obtain a maximum allowable power for the battery lower than the read first power, thus protecting the battery against aging.

The vehicle may also comprise means for measuring the current circulating in the battery and means for instantaneously calculating the first coefficient, giving:

- a first coefficient value equal to one during the start-up of the vehicle,
- an increased first coefficient value if the measured current circulating in the battery is negative,
- a decreased first coefficient value if the measured current circulating in the battery is greater than a current threshold, or
- an increased first coefficient value if the current circulating in the battery is between zero and said current threshold and the first coefficient was increased at the previous time point or a decreased first coefficient value if the current circulating in the battery is between zero and said current threshold and the first coefficient was decreased at the previous time point.

Such a system operates iteratively and delivers a new coefficient value with each new iteration, that is to say at each new time point. The system for example may increase or decrease the coefficient by the same amount with each iteration.

A system is obtained that determines a coefficient value depending on the current provided to the battery, said coefficient value being negative if the battery delivers current, that is to say during discharge, and positive if the battery receives current, that is to say during charging. In addition, the current generally has a higher value during regenerative braking, and the current threshold can thus be selected such that it indicates that a braking phase with energy recovery is implemented.

This variant in particular has the advantage of making it possible to obtain high values of allowable power for very short periods and thus to ensure the recharging of the battery without damaging said battery.

In addition, the maximum authorized power may decrease slowly over a long braking phase so as not to cause jerks and jolts for the driver.

In a variant, the vehicle also comprises means for measuring the average power provided to the battery during a period of time and means for instantaneously calculating the first coefficient, giving:

- a first coefficient value equal to one during start-up of the vehicle,
- an increased first coefficient value if said average power is lower than said second maximum power value, or
- a decreased first coefficient value if said average power is greater than said second maximum power value.

Thus, the average level of power effectively applied during said period is calculated at each time point. The coefficient is decreased or increased depending on the second maximum power value, this corresponding to charging by means of a terminal. In fact, if the average power is greater than the maximum allowable power for a charging phase, it is preferable to decrease the coefficient so as to protect the battery.

The battery may be formed of one or more cells, the system comprising means for measuring the voltage at the terminals of one cell and additional means for limiting the maximum allowable power for the battery, providing a third maximum power value calculated depending on a maximum voltage value and the measured voltage of the cell.

Thus, two limitations are implemented, the lowest value being stored so as to protect the battery.

In accordance with one embodiment, a method is proposed for regulating the charging of a rechargeable electric accumulation battery for a motor vehicle with electric or hybrid propulsion comprising a braking system allowing the recovery of energy, the battery being rechargeable during braking phases and during charging phases (for example when the vehicle is stationary at a terminal).

In accordance with a general feature, the method comprises a step of determining a first maximum power corresponding to a braking phase (for example in a mapping on the basis of the temperature of the battery and the state of charge of the battery), a step of determining a second maximum power corresponding to a charging phase of the battery (for example in a mapping on the basis of the temperature of the battery and the state of charge of the battery), the first maximum power being greater than the second maximum power, and a step of adding together the first power affected by a first coefficient and the second power affected by a first coefficient $\alpha(t)$ between 0 and 1 and the second power affected by a second coefficient equal to $1-\alpha(t)$ so as to deduce from this the maximum allowable power for the battery.

It is possible to measure the current circulating in the battery and to instantaneously fix the first coefficient equal to:

- one during start-up of the vehicle,
- an increased first coefficient value if the measured current circulating in the battery is negative,
- a decreased first coefficient value if the measured current circulating in the battery is greater than a current threshold, or
- an increased first coefficient value if the current circulating in the battery is between zero and said current threshold and the first coefficient was increased at the previous time point or a decreased first coefficient value if the current circulating in the battery is between zero and said current threshold and the first coefficient was decreased at the previous time point.

In a variant it is possible to measure the average power provided to the battery during a period and to instantaneously fix the first coefficient equal to:

- one during start-up of the vehicle,
- an increased first coefficient value if said average power is lower than said second maximum power value, or
- a decreased first coefficient value if said average power is greater than said second maximum power value.

The battery may be formed of one or more cells, and the voltage at the terminals of one cell is measured, the maximum allowable power for the battery additionally being limited on the basis of a third maximum power value calculated depending on a maximum voltage value and the measured voltage of the cell.

BRIEF DESCRIPTION OF THE DRAWINGS

Further objectives, features and advantages will become clear upon reading the following description, given merely by way of non-limiting example and with reference to the accompanying drawings, in which.

DETAILED DESCRIPTION

Figure 7:
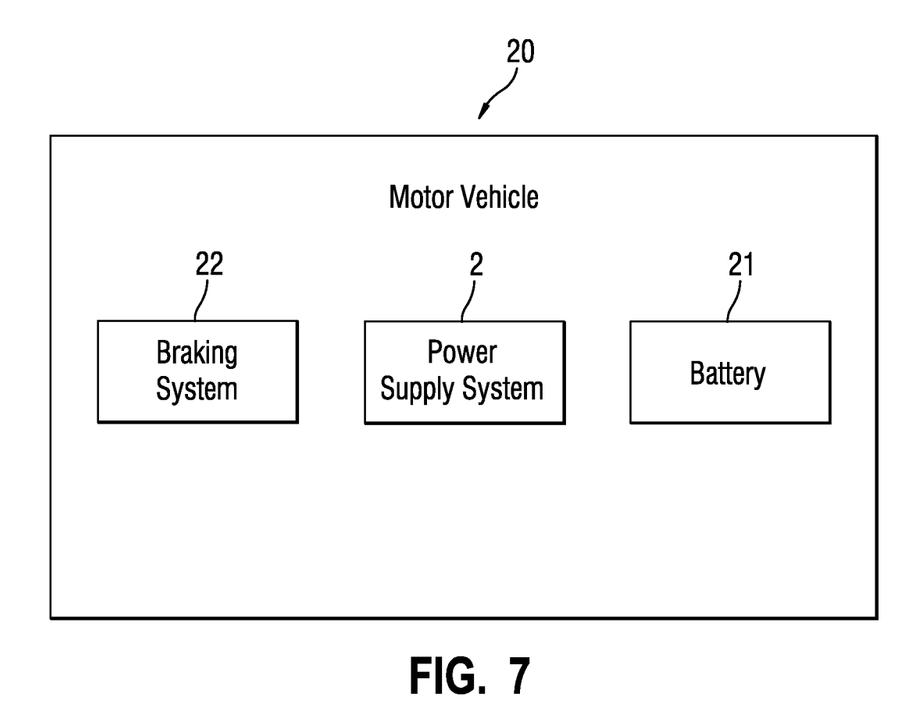
FIG. 7 illustrates a vehicle including a system according to the invention.

FIG. 7 shows a motor vehicle 20 with electric or hybrid propulsion is proposed, said vehicle comprising a rechargeable electric accumulation battery 21, a braking system 22 allowing the recovery of energy, the battery being rechargeable during braking phases and during charging phases (for example when the vehicle is stationary at a terminal) under the control of a power supply system 2 comprising means for determining a maximum allowable power for the battery.

For a motor vehicle battery comprising one or more individual cells, the creation of maximum allowable power mappings can be implemented by means of mappings of the internal resistance of a battery cell (denoted $DCR_{cell}$). These mappings can be obtained by steps prior to calibration and make it possible to read this resistance depending on the state of charge of the battery and the temperature of the battery. The state of charge of the battery BSOC is directly dependent on cell open circuit voltages OCV and can thus be measured by means of voltage sensors.

The maximum authorized voltage $V_{LimitePIN}$ for a cell through which a current is passed during a braking phase with energy recovery can also be obtained by calibration, as can the maximum voltage $V_{LimitePCHG}$ authorized by a cell through which a current is passed during a charging phase.

Figure 1:
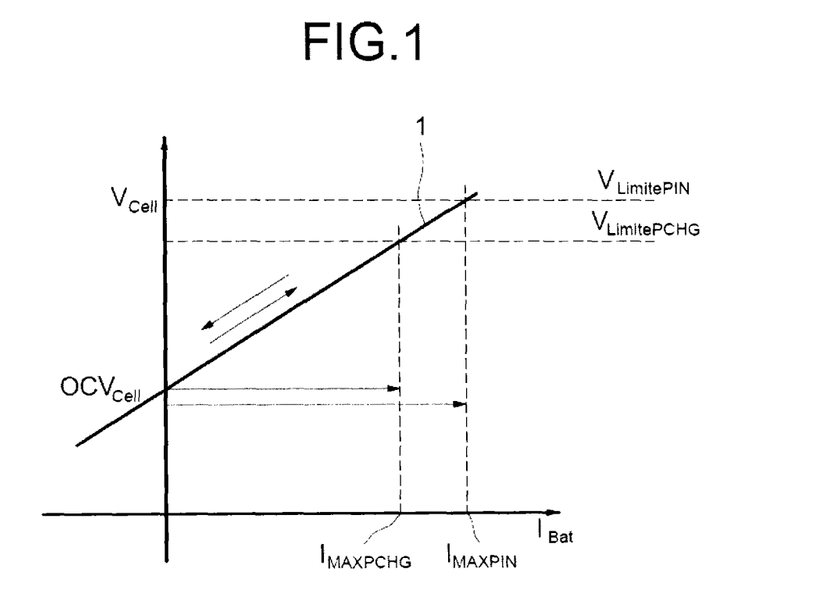
FIG. 1 illustrates how mappings are obtained.

FIG. 1 shows the development at the terminals of a battery cell depending on the current passing therethrough (line 1). The voltage at the terminals of a battery cell $V_{cell}$ is equal to the open circuit voltage OCV for a current $I_{BAT}$ of zero. This voltage develops with a gradient linked to the resistance of the cell $DCR_{cell}$, which is read in a mapping. With the values $V_{LimitePIN}$ and $V_{LimitePCHG}$ determined previously, the corresponding known values of current $I_{MAXPIN}$ for the maximum current authorized during a braking phase and $I_{MAXPCHG}$ for the maximum current authorized during a charging phase can be obtained. Although a graphical resolution is possible to determine the maximum allowable powers for the battery for a charging phase and for a braking phase, these can also be obtained by means of equation 1:

$$P_{BAT}^{MAXPIN} = \frac{V_{LimitePIN} \cdot OCV}{DCR_{cell}} \cdot V_{LimitePIN} \quad \text{EQ. 1}$$

$$P_{BAT}^{MAXPCHG} = \frac{V_{LimitePCHG} \cdot OCV}{DCR_{cell}} \cdot V_{LimitePCHG}$$

Where:
$P_{BAT}^{MAXPIN}$: Maximum power authorized during a braking phase and
$P_{BAT}^{MAXPCHG}$: Maximum power authorized during a charging phase.

It is then possible to form a first mapping comprising maximum power values $P_{BAT}^{MAXPIN}$ depending on the temperature and the state of charge of the battery, and a second mapping comprising maximum power values $P_{BAT}^{MAXPCHG}$ depending on the temperature and the state of charge of the battery.

At each time point (denoted t), a maximum allowable power for the battery is thus obtained and can be calculated with equation 2:

$$BATPIN(t) = \alpha(t) \cdot BATPIN_{POWERMAP}(t) + (1-\alpha(t)) \cdot ChaPow_{POWERMAP}(t) \quad \text{EQ. 2}$$

Where:
BATPIN(t): Maximum allowable power for the battery at the time point t,
$BATPIN_{POWERMAP}(t)$: Maximum power during braking phase at the time point t, obtained in one of the mappings,
$ChaPow_{POWERMAP}(t)$: Maximum power during charging phase at the time point t, obtained in one of the mappings, and
$\alpha(t)$: Coefficient between zero and one.

It can be noted that if the coefficient $\alpha(t)$ is equal to 1, the allowable power is the power allowable with regenerative braking, which is a high value. If the coefficient is equal to zero, the allowable power is the power allowable during a charging phase, this being a low value that can be applied for a long time without damaging the battery.

Figure 2:
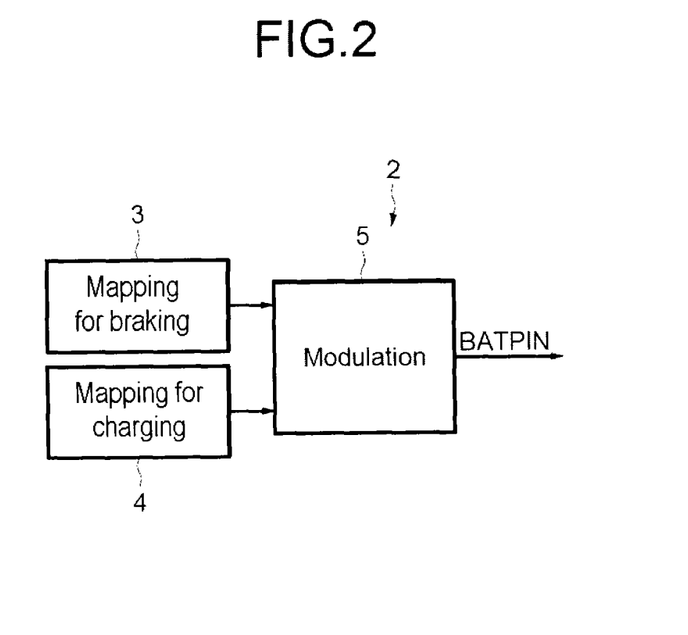
FIG. 2 schematically illustrates a system according to the invention.

FIG. 2 shows a power supply system 2 comprising means for determining a maximum allowable power in particular able to implement the calculation of equation 2. By using on the one hand a mapping 3 comprising values corresponding to the braking phases and on the other hand a mapping 4 comprising values corresponding to the charging phases, it is possible to use calculation or modulation means 5 intended to provide the value BATPIN(t).

A variant for calculating the coefficient $\alpha(t)$ will now be described in greater detail with reference to FIG. 3.

For example, $\alpha(t)$ can be selected to be zero with start-up of the vehicle, that is to say for t equal to zero. Then, if for an iteration (denoted $t_n$) the battery is in a discharging phase, the current $I_{BAT}$ being negative at the time point $t_n$, it is known that it is possible to increase the coefficient $\alpha(t)$ for the next iteration ($t_{n+1}$) so as to authorize a greater allowable power. Of course, the coefficient $\alpha(t)$ still remains between zero and 1. An increase in a discharging phase is thus obtained, as indicated in equation 3:

$$\alpha(t_{n+1}) = \min(1, \alpha(t_n) + \rho_0) \quad \text{EQ. 3}$$

Where:
$\rho_0$: constant selected previously.

If the current is greater than a current threshold sufficiently high to illustrate the current provided to the battery during a braking phase with energy recovery denoted $I_{max}^{BATPIN}\_THRESHOLD$, which may be dependent also on the temperature and state of charge and may thus be read in a mapping, it is known that the braking phase is currently in force and it is thus preferable to decrease the coefficient $\alpha(t)$, as indicated in equation 4:

$$\alpha(t_{n+1}) = \max(0, \alpha(t_n) - \rho_0) \quad \text{EQ. 4}$$

Lastly, if the current passing through the battery is lower than this threshold $I_{max}^{BATPIN}\_THRESHOLD$ but is positive, it is possible to increase the coefficient $\alpha(t)$ if it was being increased during the previous iteration ($t_{n-1}$), or to decrease it if it was being decreased, whilst limiting it by zero and one, as indicated in equation 5:

$$\alpha(t_{n+1}) = \max[\min\{(t_n) + \{\alpha(t_n) - \alpha(t_{n-1})\}, 1\}, 0] \quad \text{EQ. 5}$$

Figure 3:
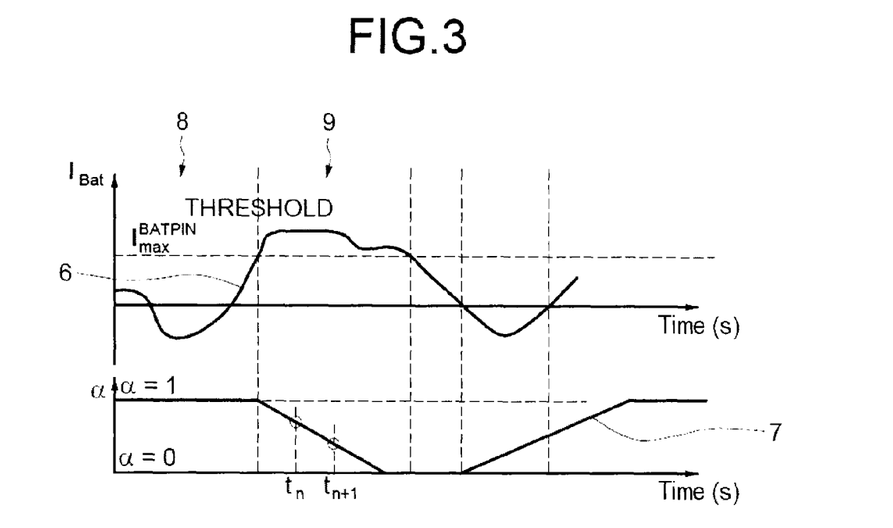
FIG. 3 illustrates a variant of an embodiment according to the invention.

FIG. 3 shows an example of a curve 6 of development of the current passing through the battery $I_{BAT}$ as a function of time. This figure also shows a curve 7 of the development of the value of the coefficient $\alpha(t)$.

It can be noted that, as indicated before, the current is firstly negative, that is to say lower than the threshold (period 8), and since it was equal to one at the initial time point, it remains at this value. Then, in a braking phase (period 9), the current exceeds the threshold $I_{max}^{BATPIN}\_THRESHOLD$ and the coefficient decreases, for example between the time points $t_n$ and $t_{n+1}$ until reaching zero. Thus, if the braking phase is long, the allowable power will be low so as not to damage the battery.

In addition, the constant $\rho_0$ can be selected so as to reduce or increase the coefficient more quickly or slowly, and therefore the maximum allowable power.

Figure 4:
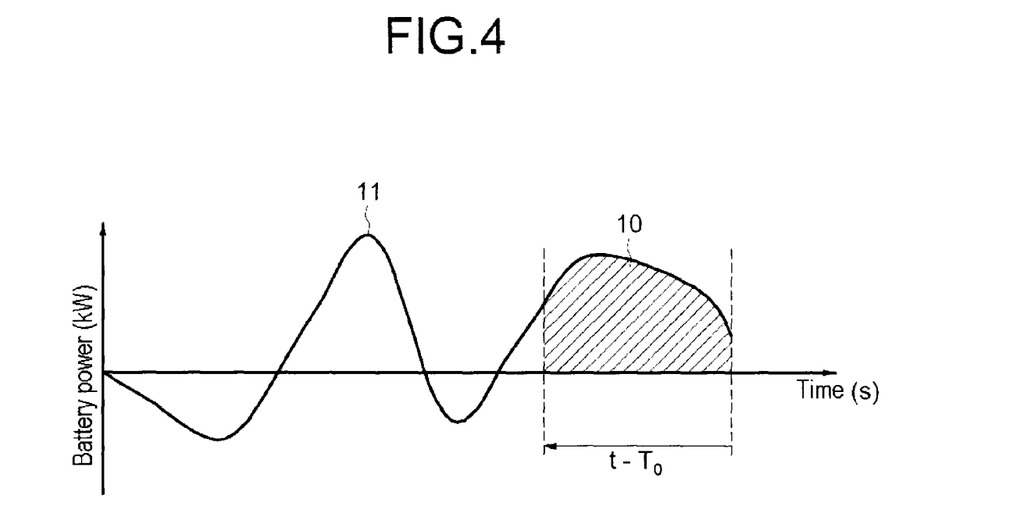
FIG. 4 illustrates a further variant of an embodiment according to the invention.

In a variant, it is possible to determine the coefficient on the basis of the average level of power effectively applied to the battery. It is possible to equip the system with means for measuring the current passing through the battery $I_{BAT}$ and with means for measuring the voltage at the terminals of the battery $V_{BAT}$. By selecting a fixed period denoted $T_0$, the average power PowerAverage(t) can be written as follows:

$$PowerAverage(t) = \int_{t-T_0}^{t} V_{BAT}(\tau) \cdot I_{BAT}(\tau) \cdot d\tau \quad \text{EQ. 6}$$

FIG. 4 shows, by the hatching 10, this average power over a curve 11 showing the development of the power as a function of time.

It is thus possible to fix the coefficient $\alpha(t)$ at one at start-up and, if the average power PowerAverage(t) is greater than the maximum power corresponding to a charging phase $ChaPow_{POWERMAP}(t)$, it is possible to increase $\alpha(t)$, for example by applying the equation EQ. 3 of the previous variant, or to decrease $\alpha(t)$ if the average power PowerAverage(t) is greater than the maximum power corresponding to a charging phase $ChaPow_{POWERMAP}(t)$ (equation EQ. 4).

Figure 5:
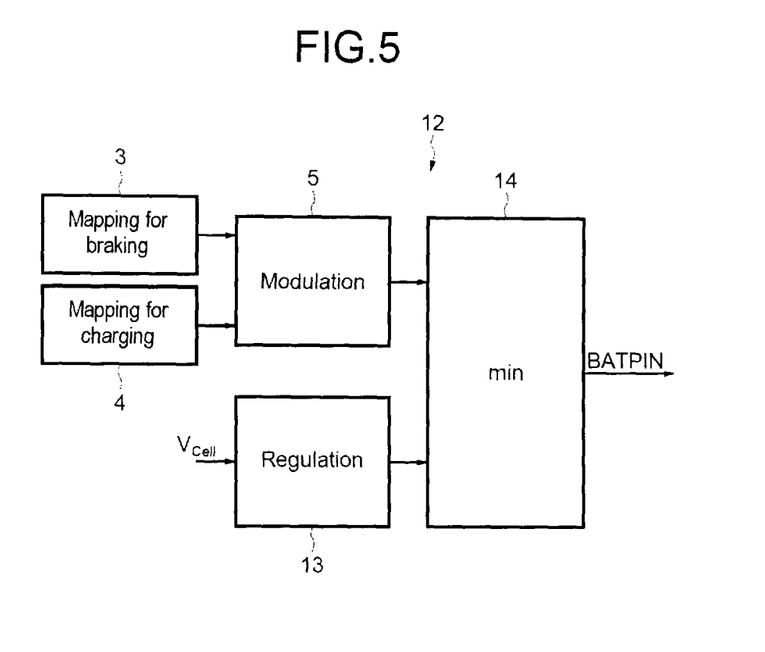
FIGS. 5 and 6 illustrate yet a further variant of an embodiment according to the invention.

FIG. 5 shows another system 12, further comprising two mappings of the means 13 for regulation depending on the maximum voltage $V_{LimitePIN}$ of a regenerative braking cell, for example obtained in a mapping as indicated above. On the basis of this value and the voltage at the terminals of a cell $V_{cell}$, it is possible to determine the authorized increase of the current and of the voltage so as not to exceed the limit $V_{LimitePIN}$. It is possible to deduce from this a power value in such a way as to protect the battery, for example using means 14 for determining the minimum value between this power and the power BATPIN(t).

Figure 6:
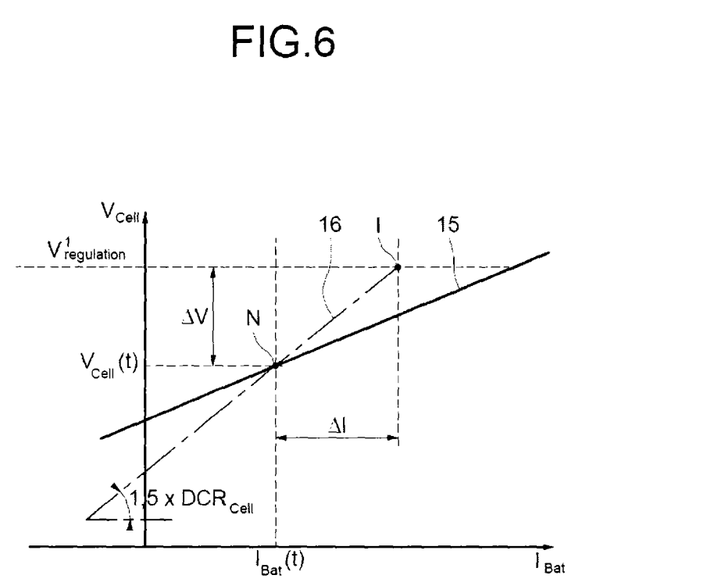

As illustrated in FIG. 6, the voltage at the terminals of a cell $V_{cell}$ varies linearly (line 15), for example with a gradient equal to the resistance of a cell $DCR_{cell}$. By knowing the value $V_{LimitePIN}$, it is possible to determine the authorized variation of voltage $\Delta V$ on the basis of the instantaneous value $V_{cell}(t)$ for a current $I_{bat}(t)$ so as not to exceed $V_{LimitePIN}$. In addition, for further safety, it is possible to determine a reduced authorized current variation value $\Delta I$. To this end, the intersection I of the line 16 passing via the point N and of gradient 1.5 times $D_{cell}$ with the authorized voltage limit $V_{LimitePIN}$ is determined. In addition, it is possible to obtain another value of authorized maximum power $BATPIN_{reg}(t)$ by means of equation 7:

$$BATPIN_{reg}(t) = \{V_{LimitePIN}\} \times \{I_{bat}(t) + \Delta I\} \qquad \text{EQ. 7}$$

$$\Delta I = \frac{V_{LimitePIN} - V_{cell}}{1.5 \times DCR_{cell}} \qquad \text{EQ. 8}$$

Of course, it is possible to select a different value to multiply the gradient of the line, but it is preferable to select this so as to be greater than one.

The value $BATPIN_{reg}(t)$ can be compared with the value $BATPIN(t)$, for example in a system described with reference to FIG. 5.

A limitation of the maximum power allowable by a battery is obtained, which limitation adapts depending on the use of the vehicle and can be implemented by calculation means installed within a vehicle.

The invention claimed is:

1. A motor vehicle with electric or hybrid propulsion comprising:
    a rechargeable electric accumulation battery;
    a braking system allowing recovery of energy;
    the battery being rechargeable during braking phases and during charging phases during which the vehicle is stationary under control of a power supply system comprising means for determining a maximum allowable power for the battery, the means for determining the maximum allowable power for the battery comprises a first mapping including a first maximum power on the basis of temperature and state of charge of the battery and a second mapping including a second maximum power on the basis of the temperature and state of charge of the battery, the first maximum power being greater than the second maximum power, the first mapping comprising first maximum power values corresponding to a braking phase and the second mapping comprising second maximum power values corresponding to a charging phase of the battery; and
    means for calculating the maximum allowable power for the battery, the means configured to calculate the sum of the first maximum power affected by a first coefficient $\alpha(t)$ between 0 and 1 and of the second maximum power affected by a second coefficient equal to $1-\alpha(t)$.

2. The vehicle as claimed in claim 1, further comprising means for measuring current circulating in the battery and means for instantaneously calculating the first coefficient $\alpha(t)$ giving:
    a first coefficient value equal to one during the start-up of the vehicle,
    an increased first coefficient value if the measured current circulating in the battery is negative,
    a decreased first coefficient value if the measured current circulating in the battery is greater than a current threshold, or
    an increased first coefficient value if the current circulating in the battery is between zero and the current threshold and the first coefficient was increased at a previous time point or a decreased first coefficient value if the current circulating in the battery is between zero and the current threshold and the first coefficient was decreased at the previous time point.

3. The vehicle as claimed in claim 1, further comprising means for measuring average power provided to the battery during a period and means for instantaneously calculating the first coefficient $\alpha(t)$, giving:
    a first coefficient value equal to one during start-up of the vehicle,
    an increased first coefficient value if the average power is lower than the second maximum power value, or
    a decreased first coefficient value if the average power is greater than the second maximum power value.

4. The vehicle according to claim 1, wherein the battery is formed of one or more cells, the system comprising means for measuring a voltage at terminals of one cell and additional means for limiting the maximum allowable power for the battery providing a third maximum power value calculated depending on a maximum voltage value and the measured voltage of the cell.

5. A method for regulating charging of a rechargeable electric accumulation battery for a motor vehicle with electric or hybrid propulsion including a braking system allowing recovery of energy, the battery being rechargeable during braking phases and during charging phases during which the vehicle is stationary, the method comprising:
    determining a first maximum power value corresponding to a braking phase;
    determining a second maximum power corresponding to a charging phase of the battery, the first maximum power being greater than the second maximum power;
    adding together the first maximum power affected by a first coefficient $\alpha(t)$ between 0 and 1 and the second maximum power affected by a second coefficient $1-\alpha(t)$ to deduce from this the maximum allowable power for the battery; and
    limiting the charging of the battery to the maximum allowable power for the battery in order to prevent damaging the battery.

6. The method as claimed in claim 5, wherein the current circulating in the battery is measured and the first coefficient $\alpha(t)$ is fixed instantaneously, equal to:
    one during start-up of the vehicle,
    an increased first coefficient value if the measured current circulating in the battery is negative,
    a decreased first coefficient value if the measured current circulating in the battery is greater than a current threshold, or
    an increased first coefficient value if the current circulating in the battery is between zero and the current threshold and the first coefficient was increased at a previous time point or a decreased first coefficient value if the current circulating in the battery is between zero and the current threshold and the first coefficient was decreased at the previous time point.

7. The method as claimed in claim 5, wherein the average power provided to the battery during a period is measured and the first coefficient $\alpha(t)$ is fixed instantaneously, equal to:

one during start-up of the vehicle,
an increased first coefficient value if the average power is lower than the second maximum power value, or
a decreased first coefficient value if the average power is greater than the second maximum power value.

8. The method as claimed in claim 5, wherein the battery is formed of one or more cells, and a voltage at terminals of one cell is measured, the maximum allowable power for the battery additionally being limited on the basis of a third maximum power value calculated depending on a maximum voltage value and the measured voltage of the cell.

9. The vehicle according to claim 2, wherein the battery is formed of one or more cells, the system comprising means for measuring a voltage at terminals of one cell and additional means for limiting the maximum allowable power for the battery providing a third maximum power value calculated depending on a maximum voltage value and the measured voltage of the cell.

10. The vehicle according to claim 3, wherein the battery is formed of one or more cells, the system comprising means for measuring a voltage at terminals of one cell and additional means for limiting the maximum allowable power for the battery providing a third maximum power value calculated depending on a maximum voltage value and the measured voltage of the cell.

11. The method as claimed in claim 6, wherein the battery is formed of one or more cells, and a voltage at terminals of one cell is measured, the maximum allowable power for the battery additionally being limited on the basis of a third maximum power value calculated depending on a maximum voltage value and the measured voltage of the cell.

12. The method as claimed in claim 7, wherein the battery is formed of one or more cells, and a voltage at terminals of one cell is measured, the maximum allowable power for the battery additionally being limited on the basis of a third maximum power value calculated depending on a maximum voltage value and the measured voltage of the cell.

\* \* \* \* \*